United States Patent [19]

Bartran

[11] Patent Number: 4,563,098

[45] Date of Patent: Jan. 7, 1986

[54] GRADIENT COMPENSATED TEMPERATURE PROBE AND GRADIENT COMPENSATION METHOD

[76] Inventor: David S. Bartran, 21223 Parkwick, Katy, Tex. 77450

[21] Appl. No.: 522,869

[22] Filed: Aug. 12, 1983

[51] Int. Cl.$^4$ ............................................. G01K 7/00
[52] U.S. Cl. ..................................... 374/172; 374/163
[58] Field of Search ............... 374/172, 169, 164, 163; 338/23

[56] References Cited

U.S. PATENT DOCUMENTS

| | | | |
|---|---|---|---|
| 3,296,866 | 1/1967 | Zenmon et al. | 374/164 |
| 3,832,902 | 9/1974 | Usami et al. | 374/164 |
| 3,878,728 | 4/1975 | Marzetta | 374/164 |
| 4,092,863 | 6/1978 | Turner | 374/169 |
| 4,183,248 | 1/1980 | West | 374/164 |

*Primary Examiner*—Steven L. Stephan
*Assistant Examiner*—David R. Schuster
*Attorney, Agent, or Firm*—Wood, Herron & Evans

[57] ABSTRACT

A gradient compensated temperature probe including a probe body and a temperature responsive element in the probe body at a measuring location couplable to a conventional temperature sensing circuit. The probe further includes a heating element spaced apart from the temperature responsive element for heating the probe to compensate for a temperature gradient along the probe. The probe further includes a bridge circuit, the legs of which each include a temperature dependent resistor located in the probe body between the heating element and the temperature responsive element. A comparator detects a temperature difference between the two temperature dependent resistors to control the application of power to the heating element to provide temperature gradient compensation for the probe.

8 Claims, 3 Drawing Figures

GRADIENT COMPENSATED TEMPERATURE PROBE AND GRADIENT COMPENSATION METHOD

This application is a continuation-in-part of application Ser. No. 332,109, filed Dec. 18, 1981.

DESCRIPTION OF THE INVENTION

This invention relates generally to temperature probes and more particularly concerns a gradient compensated temperature probe and a method for providing temperature gradient compensation for a temperature probe.

Temperature probes are used in many settings to determine the temperatures of solids and fluids, gases and liquids, in laboratory and industrial environments. For example, a temperature probe may be used to measure the temperature of a liquid which is heated in a tank or other container. Or a temperature probe may be inserted through the wall of a pipe or other conduit to monitor the temperature of a gas or a liquid flowing therein.

Such temperature probes may take a variety of forms. As will be noted herein, with regard to an exemplary embodiment, the invention may find advantageous, but not exclusive, use with a temperature probe having an elongated probe body with a temperature responsive element at the end thereof. In such a temperature probe, the temperature responsive element, which may be, for example, a temperature dependent resistance, is electrically connected through conductors extending within the probe body to a suitable temperature sensing circuit. The end of the probe bearing the temperature responsive element is placed in contact with, or within, the material whose temperature is to be measured, and the temperature sensing circuit determines from the resistance of the temperature responsive element the temperature of the material which is being measured.

Since the temperature responsive element is in the temperature probe body, the temperature of the probe body, as well as the measured material temperature, has an effect on the temperature indicated by the temperature responsive element in the probe. In many measuring arrangements, a portion of the probe is not in contact with the material whose temperature is to be measured. For example, if a tank of a heated liquid is measured by a temperature probe of the foregoing type, typically only part of the probe body is immersed in the liquid. The unimmersed portion of the probe body is in ambient air which may have a considerably lower temperature than that of the liquid being measured. This can have a heat-sinking effect on the probe body, lowering the temperature of the portion of the probe adjacent the temperature responsive element, thereby lowering the measured temperature for the liquid.

In the case where a temperature probe is mounted in the wall of a conduit carrying a fluid to be measured, the conduit wall may be highly thermally conductive, such as a metal, which will act as a heat sink for the probe body where it is in contact with the conduit wall. Again, this will have a heat-sinking effect on the probe body to lower the temperature sensed by the temperature responsive element in the probe inside the conduit in the fluid to be measured.

It is the general aim of the invention to eliminate the temperature gradient along a temperature probe which is produced in temperature measurement arrangements such as those of the foregoing type. In carrying out the invention, a temperature probe is provided which includes a probe body having a temperature responsive element therein and a heating element in the probe body spaced apart from the temperature responsive element. In the case of an elongated probe, the temperature responsive element may be near the tip of the probe and the heating element near the other end of the probe.

In the illustrated form of the invention, the temperature gradient between the heating element and the temperature reponsive element along the probe is sensed and, in response to sensing such a gradient, the heating element is activated. The temperature gradient is measured by placing two temperature dependent resistors along the probe body between the temperature responsive element and the heating element, with these two temperature dependent resistors electrically connected in the legs of a bridge circuit. A temperature gradient along the probe is detected as an imbalance in the bridge using a comparator, which in turn activates the heating element to heat the probe to compensate for the temperature gradient along the probe body. The normal temperature gradient along the probe is thereby compensated on a closed-loop basis.

Further objects and advantages of the invention, and the manner of their implementation, will become apparent upon reading the following detailed description and upon reference to the drawings, in which.

Figure 1:
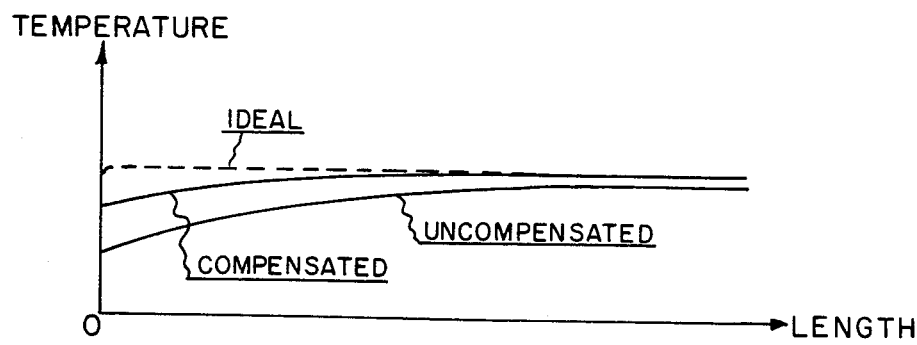
FIG. 1 is a diagram of temperature along the probe body with and without compensation.
Figure 2:
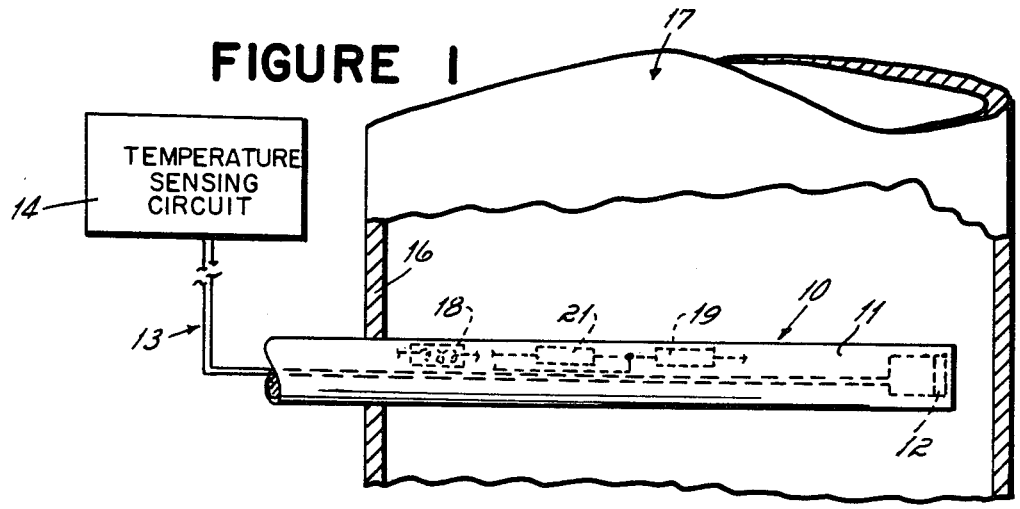
FIG. 2 is a diagrammatic representation of a temperature probe constructed in accordance with the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

With reference now to the figures, a temperature probe, indicated generally 10, includes a probe body 11 and a temperature responsive element 12 at the tip thereof. The temperature responsive element 12 is connected by electrical conductors 13 to a temperature sensing circuit 14. The temperature responsive element 12 may be any conventional element which varies in electrical characteristic in response to temperature. The temperature sensing circuit 14 detects the variations in the electrical characteristic of the temperature responsive element 12 in order to provide an indication of the temperature at the temperature responsive element. The probe body 11 may be filled with a ceramic fill, not shown. As thus far described, the temperature probe 10 is entirely conventional.

In the illustrated environment, the temperature probe 10 is mounted in the wall 16 of a cylindrical conduit 17 carrying a fluid whose temperature is to be measured. The fluid (not shown) in the conduit 17 may surround part or all of the portion of the probe 10 lying inside the conduit. The probe body 11 and the wall 16 of the conduit 17 are in thermal contact, with each having a certain degree of thermal conductivity, depending upon the materials of the probe body and the conduit wall.

As shown in FIG. 1, ideally for accurate temperature measurement, the temperature of the probe is substantially constant along its entire length. In practice, due to the heat sinking effect of the conduit wall 16 on the probe, the probe temperature, as indicated by the "uncompensated" curve varies along the length of the probe, increasing from the point at which the probe contacts the wall to the tip of the probe, at which the temperature responsive element 12 is located. It can be seen further from FIG. 1 that the uncompensated temperature at the tip of the probe is lower than the ideal temperature, the true temperature of the fluid in the conduit 17 which is to be measured.

In accordance with the invention, the temperature along the probe is compensated, generally to be as shown in the "compensated" curve of FIG. 1, in order to reduce the temperature variation along the probe. More importantly, the temperature at the tip of the probe is restored to be substantially the ideal temperature, equal to the fluid temperature which it is desired to measure.

The desired gradient compensation is provided in the illustrated form of the invention by the activation of a heating element 18 mounted in the probe body 11 at a location spaced apart from the location of the temperature responsive element, which in the present case is at the tip of the probe. The activation of the heating element 18 is controlled to compensate for the temperature gradient along the probe body 11. In order to do this, the temperature of the probe at two locations intermediate the heating element 18 and the temperature responsive element 12 are sensed and compared using a pair of temperature sensitive resistors 19, 21. While in the present instance the temperature sensing components are positive temperature coefficient temperature dependent resistors, other devices such as non-inductively wound resistance-temperature-detectors (RTD's), thermocouple elements, thermistor elements, or other devices could be used.

Figure 3:
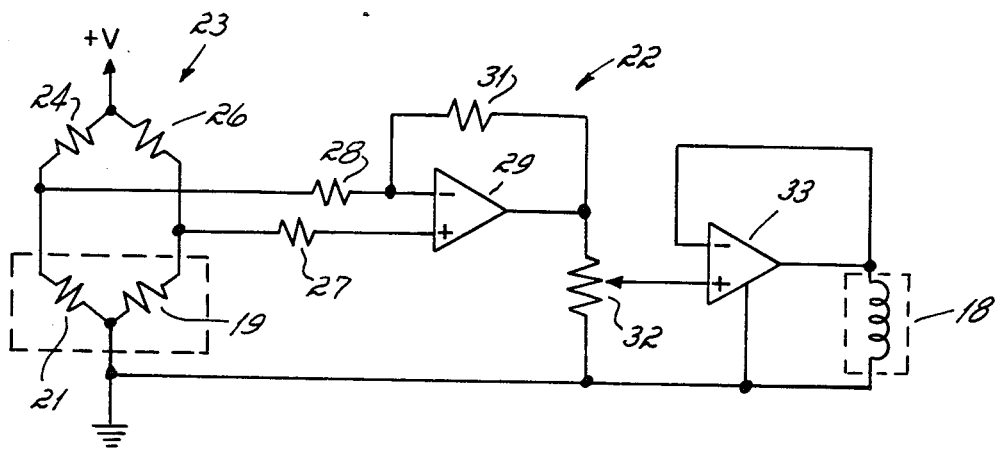
FIG. 3 is an electrical circuit diagram of a temperature probe arrangement in accordance with the present invention, including certain of the components illustrated in FIG. 2.

With reference to FIG. 3, an electrical control circuit for the heating element 18, indicated generally as 22, includes the temperature dependent resistors 19, 21 and serves to compare the temperatures indicated at each of these two resistors. The circuit 22 further serves to activate the heating element 18 if the temperature probe is cooler at the resistor 21 than at the resistor 19. In the illustrated circuit, the temperature dependent resistors 19 and 21 are in the legs of a conventional resistance bridge 23. A resistor 24 in series with the temperature dependent resistor 21 and a resistor 26 in series with the temperature dependent resistor 19 form the two legs of the bridge. The resistors 24 and 26 are matched in value, and the two temperature dependent resistors 19, 21 are also matched for resistance over the range of temperatures of interest.

A dc voltage +V is applied across the bridge 23, and the resultant voltages across the temperature dependent resistors 19 and 21 are coupled through current limiting resistors 27, 28 to the non-inverting and inverting inputs, respectively, of a comparator 29. The comparator 29 is an operational amplifier having a feedback resistor 31, producing a positive output if the voltage across the temperature dependent resistor 19 exceeds that across the temperature dependent resistor 21.

Since the temperature dependent resistors 19, 21 are positive temperature coefficient resistors, the voltage across the resistor 19 will exceed that across the resistor 21 if the probe is warmer at the resistor 19 than at the resistor 21. This is indicative of a temperature gradient along the probe 10.

In response to such a temperature gradient, and the consequent positive output of the comparator 29, the heating element 18 is activated to compensate for this temperature gradient. To do this, the positive output of the comparator 29 is coupled through a potentiometer 32 to the non-inverting input of an amplifier 33. The output of this amplifier in turn drives the heating element 18, resulting in the application of heat to the temperature probe by the heating element.

To summarize, therefore, the existence of a temperature gradient along the probe body 11 is indicated by the sensed temperature differential at the locations of the temperature dependent resistors 19 and 21. This sensed difference in temperature in turn results in the activation of the heater 18 to compensate for the temperature gradient.

In the illustrated form of the invention, the temperature dependent resistances 19 and 21 are matched for use in the simple comparator circuit shown. Obviously, other circuits could be employed such as those which could compensate for some differences in the characteristics of the temperature dependent resistances 19 and 21.

While only a single, presently preferred, embodiment of the invention is described, those persons skilled in the art to which this invention pertains will readily appreciate numerous changes and modifications which may be made without departing from the spirit of the invention. For example, the geometrical configuration of the probe 10 or the environment in which the temperature is measured could be widely varied.

What is claimed is:

1. A gradient compensated temperature probe arrangement comprising:
    a probe body;
    a temperature responsive element in the probe body couplable to a temperature sensing apparatus;
    a heating element in the probe body spaced apart from the temperature responsive element;
    first means independent of the temperature responsive element for sensing a temperature gradient between the heating element and the temperature responsive element along the probe body at a location spaced apart from the temperature responsive element including at least two temperature dependent electrical components positioned along the probe body between the heating element and the temperature responsive element; and
    second means, responsive to the sensing of a temperature gradient by the first means, for activating the heating element.

2. The temperature probe arrangement of claim 1 in which the first means comprises a first temperature dependent electrical component proximal the temperature dependent element and a second temperature responsive electrical component proximal the heating element, and means, outside the probe body and electrically coupled to the two temperature responsive electrical components, for sensing a temperature difference between the two electrical components.

3. The temperature probe arrangement of claim 2 in which the probe body is an elongated tube in which the temperature responsive element is positioned near a first end of the tube.

4. A gradient compensated temperature probe arrangement comprising:
- a probe body;
- a temperature responsive element in the probe body couplable to a temperature sensing apparatus;
- a heating element in the probe body spaced apart from the temperature responsive element;
- a first temperature dependent resistor proximal the temperature responsive element;
- a second temperature dependent resistor coupled to the first resistor and proximal the heating element;
- first means for sensing a temperature gradient between the heating element and the temperature responsive element along the probe body including a bridge circuit in which one leg of the bridge comprises the first temperature dependent resistor and a second leg of the bridge comprises the second temperature dependent resistor; and
- second means responsive to the sensing of a temperature gradient by the first means for activating the heating element.

5. The temperature probe arrangement of claim 4 in which the first means further comprises a comparator having its inputs coupled to the bridge and having an output at which an electrical signal is produced indicative of a temperature gradient between the heating element and the temperature responsive element along the probe body.

6. The temperature probe arrangement of claim 5 in which the second means comprises an amplifier coupled to the output of the comparator of the first means.

7. The temperature probe arrangement of claim 6 in which the temperature dependent resistors have a positive temperature coefficient and in which the first resistor is coupled to a non-inverting input of said comparator and the second resistor is coupled to an inverting input of said comparator.

8. A method for compensating a temperature probe for a temperature gradient along the probe comprising the steps of:
- sensing the probe temperature at two temperature sensing locations along the probe, both locations spaced apart in the same direction from a temperature responsive element in the temperature probe, with said two locations being different distances from the temperature responsive element;
- determining if there is a temperature difference between said two probe locations; and
- heating the probe at a heating location, said temperature sensing locations being between said heating location and the temperature responsive element, to equalize the temperatures at the two temperature sensing locations.

* * * * *